April 19, 1927.
P. KUHNEL
VELOCIPEDE
Original Filed Sept. 27, 1923    2 Sheets-Sheet 1
1,625,214
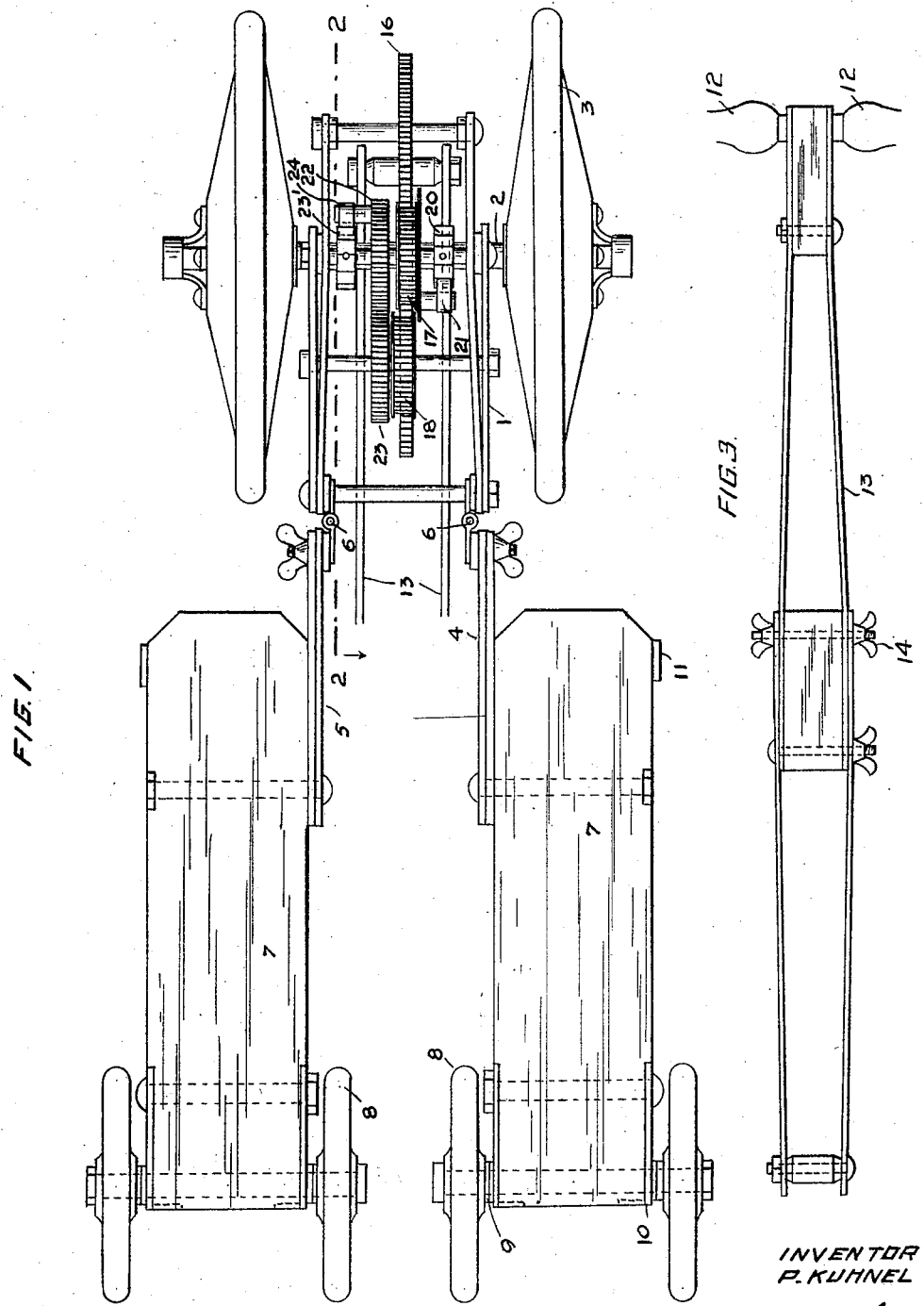
INVENTOR
P. KUHNEL
BY
ATT'YS.

April 19, 1927. 1,625,214
P. KUHNEL
VELOCIPEDE
Original Filed Sept. 27, 1923    2 Sheets-Sheet 2
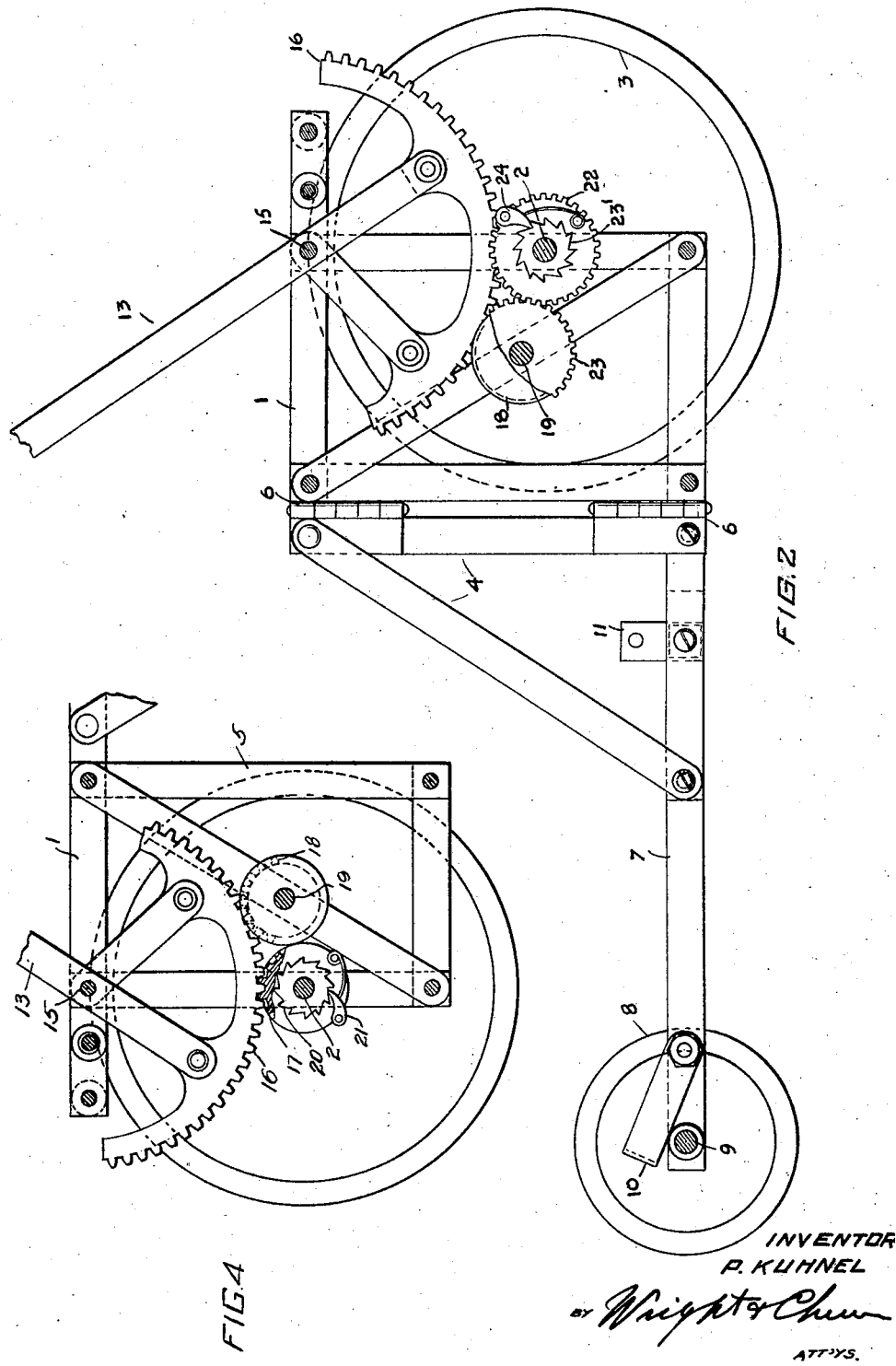
INVENTOR
P. KUHNEL
BY Wright & Chun
ATT'YS.

Patented Apr. 19, 1927.

1,625,214

UNITED STATES PATENT OFFICE.

PAUL KUHNEL, OF SAN FRANCISCO, CALIFORNIA.

VELOCIPEDE.

Application filed September 27, 1923, Serial No. 665,089. Renewed September 7, 1926.

This invention relates to improvements in velocipedes and resides in the provision of a novel and useful vehicle of this nature which is simply constructed, strong, durable, compact and capable of being easily and swiftly propelled over the ground by the operator while standing on the vehicle.

An object of the invention is to provide a velocipede of the character described in which the propulsion means is operated by means of a lever accessible when the operator stands on the machine in upright position, said lever also serving as a means for steering the vehicle.

The invention possesses novelty in construction, relative arrangement and assemblage of the parts thereof, all of which go to make up a velocipede which will be interesting and amusing to operate and provide for healthful and pleasing muscle development, not only for children but for adults.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 represents a bottom plan view of the vehicle of the invention.

Fig. 2 represents a vertical sectional view of the velocipede, the operating lever being broken away.

Fig. 3 represents a fragmentary top plan view of the operating lever.

Fig. 4 represents a fragmentary vertical sectional view of the operating mechanism on the right hand side of the vehicle taken on a line (not shown) just in front to the right of the ratchet wheel 20 and looking towards the left, the ratchet supporting gear and ratchet being in different positions from that shown in Fig. 1.

The embodiment of the invention shown in the accompanying drawing comprises a main frame 1, preferably of skeleton construction, which frame supports an axle 2 on which axle wheels 3 are fixed so as to be disposed on opposite sides of the frame. Auxiliary frames 4 and 5 are secured by vertical hinges 6 to the rear side of the main frame and to the outer sides of these auxiliary frames are attached trailers in the form of horizontal foot-boards or plates 7 which trail from the main frame and at their rear ends carry rollers 8 mounted on axles 9, the rollers being disposed on opposite sides of each footboard. Heel and toe guides 10 and 11 may be provided on the foot-boards so that the feet will not slip off of the boards. These trailers may be constructed similarly to skates except that they have no front wheels and are adapted to swing laterally on their hinges independent of one another so that they will trail behind and follow the movement of the main frame and wheels. When the weight of the operator is placed on the skate member, the two skate members will travel substantially parallel to one another. To steer the vehicle, the main frame is turned in the direction in which it is desired that the vehicle travel, said frame turning on the hinges 6 without, however, causing the trailers to move appreciably out of position parallel to one another.

The operator balances by grasping the handles 12 of the combined operating steering and balance lever 13, which lever is sectional, the sections being joined by means 14 providing for adjustment of the lever to regulate the height at which the handles will be disposed. The lever is pivoted adjacent but spaced upwardly a short distance from its lower end as at 15, to the upper part of the main frame 1, the pivot being such that the lever is limited to a forward and backward movement in the direction of the line of travel of the vehicle.

The propelling mechanism includes an arcuate rack bar or toothed segment 16, which is fixed to the lower end of the lever so that the teeth thereon will mesh with a drive pinion 17 which is loosely mounted on the shaft 2 and also with a similar pinion 18 which is loosely mounted on a shaft 19 mounted in the frame 1 and located to one side of the shaft 2. These two pinions have ratchet drive mechanisms associated therewith in such manner that on both the forward and back strokes of the lever, the wheels will be driven so as to propel the vehicle forwardly. A ratchet wheel 20 is fixed to the axle 2 on the left side of the main drive gear 17 and a spring urged pawl 21 for said ratchet wheel is pivoted on the left side of the gear 17. This pawl and the ratchet are so arranged that when the lever is moved on the back stroke, the pawl will engage with one of the teeth of the ratchet and rotate the ratchet, shaft and wheels 3 on the shaft, in such manner that the vehicle will be propelled forwardly, whereas on the forward stroke of the operating lever, the pawl rides freely over ratchet without transmitting any power to the axle. On the opposite sides of the gear 17 is a gear 22 which is loosely mounted on the shaft and meshes with a pinion 23 on the shaft 19. To the right of this gear 22 is a ratchet wheel 23′ which is fixed to the shaft. A spring urged pawl 24 is pivoted on the gear 22 so as to engage the ratchet 23′. The train of gears 18, 23 and 22 are therefore so arranged that on the forward stroke of the operating lever, the pawl 24 will engage the ratchet wheel 23′ and cause the ratchet, axle and wheels to be driven so as to propel the vehicle forwardly. On the back stroke of the lever, however, the pawl rides loosely over the ratchet. It will thus be seen, through the arrangement of gears and ratchets, the wheels will be driven forwardly on both the forward and back strokes of the operating lever, the action being continuous so that the velocipede may be smoothly and swiftly propelled.

By having the control members on which the operator stands, swiveled or hinged to the main frame and supporting the weight of the operator, freedom of movement is permitted in the operation of the vehicle, particularly in the steering, to the extent that the vehicle may be easily and effectively controlled in its movement. The two trailers provide for an easy steering action and a better riding effect and for a more simple construction and operation of the vehicle as a whole.

I claim:

A velocipede of the character described comprising a main frame, an axle on the main frame, wheels mounted on the axle, a pair of trailers pivoted to the main frame so as to swing rearwardly thereof, on which trailers the operator stands, wheels supporting each of the trailers, and means for driving the wheels for the main frame to propel the vehicle forwardly including a lever pivoted to the main frame and extending upwardly therefrom, which lever serves as a means for steering the velocipede.

PAUL KUHNEL.